United States Patent [19]

Le

[11] Patent Number: 4,900,331
[45] Date of Patent: Feb. 13, 1990

[54] OIL COMPOSITIONS CONTAINING ALKYL AMINE OR ALKYL MERCAPTAN DERIVATIVES OF COPOLYMERS OF AN ALPHA OLEFIN OR AN ALKYL VINYL ETHER AND AN UNSATURATED ALPHA, BETA-DICARBOXYLIC COMPOUND

[75] Inventor: Hanh T. Le, Wilmington, Del.
[73] Assignee: Conoco Inc., Ponca City, Okla.
[21] Appl. No.: 265,614
[22] Filed: Oct. 31, 1988
[51] Int. Cl.$^4$ .............................. C10L 1/18; C10L 1/22
[52] U.S. Cl. ................................... 44/62; 44/71; 44/76
[58] Field of Search ................................ 44/62, 71, 76

[56] References Cited

U.S. PATENT DOCUMENTS

| | | |
|---|---|---|
| 2,677,662 | 5/1954 | Mikeska ............................ 525/327.7 |
| 2,698,316 | 12/1954 | Giammaria ....................... 525/327.6 |
| 3,010,810 | 11/1961 | Stayner et al. ..................... 44/62 |
| 3,382,056 | 5/1968 | Mehmedbasich ................... 44/62 |
| 3,413,104 | 11/1968 | Mehmedbasich ................... 44/62 |
| 3,447,916 | 6/1969 | Edwards ............................ 44/62 |
| 3,578,421 | 5/1971 | Andress et al. ..................... 44/62 |
| 3,677,724 | 7/1972 | Andress ............................ 44/62 |
| 3,677,725 | 7/1972 | Andress ............................ 44/62 |
| 3,694,176 | 9/1972 | Miller ................................ 44/62 |
| 3,729,529 | 4/1973 | Andress ............................ 44/62 |
| 3,776,247 | 12/1973 | Choufoer et al. .................. 44/62 |
| 3,879,177 | 4/1975 | Andress ............................ 44/62 |
| 4,090,946 | 5/1978 | Nottes et al. ...................... 44/71 |
| 4,163,645 | 8/1979 | Cheng et al. ...................... 44/62 |
| 4,240,916 | 12/1980 | Rossi ............................... 252/56 D |
| 4,339,246 | 7/1982 | Gamamura et al. ............... 44/62 |
| 4,359,325 | 11/1982 | Dawans et al. .................... 44/62 |
| 4,416,668 | 11/1983 | Thompson ......................... 44/62 |
| 4,511,369 | 4/1985 | Denis et al. ....................... 44/62 |
| 4,518,509 | 5/1985 | Neuberry ........................... 44/62 |
| 4,731,095 | 3/1988 | Garapon et al. ................... 44/62 |

FOREIGN PATENT DOCUMENTS

| | | |
|---|---|---|
| 56-065091 | 6/1981 | Japan . |
| 59-126496A | 7/1984 | Japan . |
| 2082604 | 3/1982 | United Kingdom . |

*Primary Examiner*—William R. Dixon, Jr.
*Assistant Examiner*—Ellen M. McAvoy
*Attorney, Agent, or Firm*—Cleveland R. Williams

[57] ABSTRACT

Oil compositions comprisin crude oils, fuel oils, mineral oils and synthetic oils having high pour points are provided with one or more enhanced characteristics such as improved pour point, viscosity or viscosity index by the addition of alkyl amine or alkyl mercaptan derivatives of a copolymer comprising an alpha olefin or an alkyl vinyl ether and meleic anhydride.

17 Claims, No Drawings

OIL COMPOSITIONS CONTAINING ALKYL AMINE OR ALKYL MERCAPTAN DERIVATIVES OF COPOLYMERS OF AN ALPHA OLEFIN OR ANALKYL VINYL ETHER AND AN UNSATURATED ALPHA, BETA-DICARBOXYLIC COMPOUND

BACKGROUND OF THE INVENTION

1. Field of the Invention

This invention relates to oil compositions comprising crude oils, mineral oils, fuel oils and synthetic oils having one or more improved characteristics, such as pour point, viscosity, viscosity index, flowability and the like.

Crude, refined and synthetic oils frequently require modification or the addition of additives to improve one or more of their physical characteristics, such as, pour point, viscosity, viscosity index, etc. In particular, one more more of the above-described properties is imparted to oil compositions by the addition thereto of copolymers comprising an alkyl amine or alkyl mercaptan derivative of an alpha olefin or an alkyl vinyl ether and maleic anhydride. The copending application of Hanh T. Le, entitled "Alkyl Amine or Alkyl Mercaptan Derivatives Of An Alpha Olefin Or Alkyl Vinyl Ether And An Alpha, Beta-Dicarboxylic Compound", Ser. No. 265,611, filed Oct. 31, 1988, describes in detail how to prepare these compounds.

Crude oils, depending upon the location of production may contain substantial quantities of wax. This wax is subject to separation when the crude oil is cooled below the pour point index of the oil. Crystallized wax precipitates from crude oil at sufficiently low temperatures and the oil, as well, can completely solidify causing reducing flowability and or pumpability of the oil.

When crude oil is produced from a production well through strata having lower temperatures tha that of the oil-bearing formations, the crude oil may gel or transform into a dense or glutinous consistency, which can interfere with its transfer to the surface. The problem of crude oil and oil compositions solidifying, especially during extreme weather conditions is further emphasized during the storage of the oil in tanks which do not have insulation or heating facilities or in transporting the oil in unheated tankers or through a pipeline.

Thus, acceptable pour points and flow characteristics of an oil composition are highly desirable, particularly during production and upon storage, and transport of the oil composition; and especially during a refining operation when the oil composition is a crude oil. It should be noted that the copolymers herein, when incorporated in an oil composition, substantially lower the pour point and concomitantly enhance the flowability of the oil composition.

2. Description of the Prior Art

Processes and catalysts for the production of polymers and copolymers of organic compositions as oil additives are known and are currently practiced commercially.

For example, U.S. Pat. No. 3,677,725 relates to copolymers of (1) maleic anhydride and an alpha olefin or an alkylvinylether and (2) alkyl esters of carboxymethyl amides or carboxymethyl esters of maleic anhydride, alpha olefins or alkylvinylethers. These copolymers are described as useful for imparting antistatic properties to distillate fuel oils and other volatile liquid compositions.

U.S. Pat. No. 3,694,176 discloses copolymers of ethylene and an alpha-beta ethylenically unsaturated dicarboxylic acid or its anhydride or mono- or diester. The copolymers are described as suitable for use as wax crystal modifiers. pour point depressants and dewaxing aids for hydrocarbon oils.

U.S. Pat. No. 3,776,247 relates to a composition of matter having improved flow and friction-reducing properties which consists of a waxy crude oil containing a polymer selected from copolymers of anhydrides of dicarboxylic acids and mono-olefins or alkylvinylether copolymerized with the dialkylester of an unsaturated acid.

U.S. Pat. No. 3,879,177 discloses a process for inhibiting the crystallization of wax from a waxy crude oil produced from a subterranean formation by adding to the waxy oil a copolymer of maleic anhydride and vinylmethyl ether esterified with an alcohol containing 18 to 24 carbon atoms.

U.S. Pat. No. 4,240,916 relates to lubricating oil compositions having enhanced pour point depressant properties. Copolymers of maleic anhydride and alpha olefins are described as suitable for use in the oil compositions.

As can readily be determined from the above, there is an ongoing search for newer and more effective polymers and copolymers for use as pour point depressants in oil compositions. It should be noted, however, that the specific amine or mercaptan derivatives of the copolymers herein are new.

SUMMARY OF THE INVENTION

This invention encompasses new compositions that are particularly suitable for use as pour point depressants for oil compositions. In particular, the invention relates to oil compositions which comprise a major amount of an oil selected from a crude oil, fuel oil, mineral oil or a synthetic oil and a minor amount of an alkyl amine or alkyl mercaptan derivative of an alpha olefin or alkyl vinyl ether and an unsaturated alpha, beta dicarboxylic compound having pour point depressant properties, said copolymer comprising the reaction product of (a) an alpha olefin or a mixture of alpha olefins or a monomeric alkyl vinyl ether or a mixture of alpha olefins or alkyl vinyl ethers having the formula:

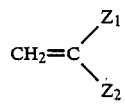

wherein $Z_1$ and $Z_2$ are the same or different, H, $R_1$ or $OR_1$ and $R_1$ is an alkyl group having 1 to 30 carbon atoms, (b) maleic anhydride; and (c) an alkyl amine or alkyl sulfide or a mixture of alkyl amines or alkyl sulfides having the formula:

wherein X is N or S and $R_2$ is an alkyl group having from about 3 to about 30 carbon atoms and y is either 1 or 2.

DETAILED DESCRIPTION OF THE INVENTION

The present invention resides in oil compositions and to alkyl amine or alkyl mercaptan derivatives of copolymers comprising an alpha olefin or alkylvinyl ether/- maleic anhydride which are particularly suitable for use in said oil compositions as pour point additives.

The alpha olefins of the present invention are derived commercially from petroleum stocks or by the dehydration of alcohols and by the pyrolysis of paraffin waxes. Significant quantities of olefins are produced by thermal and catalytic cracking of various liquid-petroleum fractions using conventional catalysts.

More recently linear olefins in general and alpha olefins in particular have been produced by ethylene-oligomerization processes based on Ziegler Chemistry. In the ethylene-oligomerization process, the oligomerization of ethylene using a Ziegler catalyst, e.g., triethylaluminum, takes place wherein ethylene adds to triethylaluminum by insertion between the aluminum atom and one of the alkyl groups until a selected average alkyl size is reached. The alkyl is converted to the corresponding olefin by displacement with a lower olefin, e.g., usually ethylene. The growth reaction is normally carried out at greater than 100° C., at higher temperatures an increasing proportion of the unreacted ethylene displaces the alkyl group from the metal alkyl and at 300° C., displacement is the predominant reaction. Suitable alpha olefins contain from about 2 to about 30 carbon atoms, especially from about 4 to about 28 carbon atoms, preferably from about 8 to about 24 carbon atoms.

Desirable alpha olefins are preferably selected from the group consisting of ethylene, propene, butene, pentene, hexene, heptene, octene, nonene, decene, undecene, dodecene, tridecene, tetradecene, pentadecene, hexadecene, heptacene, octadecene, nonodecene, eicosene, heneicosene, docosene, tricosene, tetracosene, pentacosene, hexacosene, heptacosene, octacosene, non-acosene and triacontene and mixtures thereof.

It is to be noted that the individual alpha olefins can be incorporated into the copolymers herein. However, mixtures of the alpha olefins are highly desirable in the production of said copolymers. Mixtures of alpha olefins preferably are those alpha olefins which contain from about 4 to about 28 carbon atoms.

Similarly, the alkyl vinyl ethers suitable for use herein have the formula:

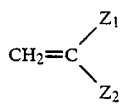

wherein $Z_1$ and $Z_2$ are the same or different, H, $R_1$ or $OR_1$ and $R_1$ is an alkyl group having 1 to 30 carbon atoms.

These compounds preferably are classified as the alkyl vinyl ethers. The alkyl moiety of the compound generally contains from about 1 to about 30 carbon atoms, preferably from about 4 to about 28 carbon atoms, most preferably from about 4 to about 24 carbon atoms.

One method of producing the alkyl vinyl ethers herein involves the oxidation of ethylene and an alkyl alcohol in contact with a palladium chloride-cuprous chloride-hydrogen chloride catalyst using conventional techniques and methods. Another typical method of producing the alkyl vinyl ethers herein is by the reaction of an alcohol with vinyl acetate in contact with a palladium-tungsten catalyst.

The alkyl vinyl ethers preferably are members selected from the group consisting of methylvinyl ether, ethylvinyl ether, propylvinyl ether, butylvinyl ether, pentylvinyl ether, hexylvinyl ether, heptylvinyl ether, octylvinyl ether, nonylvinyl ether, decylvinyl ether, undecylvinyl ether, dodecylvinyl ether, tridecylvinyl ether, tetradecylvinyl ether, pentadecylvinyl ether, hexadecylvinyl ether, heptadecylvinyl ether, octadecylvinyl ether, nonadecylvinyl ether, eicosylvinyl ether, heneicosylvinyl ether, docosylvinyl ether, tricosylvinyl ether, tetracosylvinyl ether, pentacosylvinyl ether, hexacosylvinyl ether, heptacosylvinyl ether, octacosylvinyl ether, nonacosylvinyl ether and triacontylvinyl ether and mixtures thereof.

The second monomer of the copolymers herein comprises maleic anhydride which derives its common name from malic acid, a related compound. One typical method of preparing maleic anhydride has been the catalytic oxidation of benzene using, for example, a vanadium oxide catalyst.

More recently, maleic anhydride has been prepared via the vapor-phase oxidation of hydrocarbons, such as benzene, n-butane and n-butene, using a conventional oxidation catalyst. The hydrocarbon-oxidation reaction involves oxidation of a relatively low concentration of hydrocarbon in air to form maleic anhydride, carbon oxides, water and smaller amounts of partially oxidized by-products.

The third component of the copolymers herein include an alkyl amine or an alkyl mercaptan. Generally, the alkyl amine or alkyl mercaptan herein will react with the maleic anhydride moiety of the copolymers herein after the copolymeers have been produced. The alkyl amines or alkyl mercaptans have the formula:

$$X(R_2)_y$$

wherein X is N or S and $R_2$ is an alkyl group having from about 3 to about 30 carbon atoms and y is either 1 or 2.

There are several known methods for the preparation of alkyl amines, but the most common method is the conversion of a fatty acid or a mixture of fatty acids to a nitrile by treating with ammonia, followed by catalytic hydrogenation of the nitrile to either a primary, secondary or tertiary amine by suitable adjustment of the reaction conditions. Particularly, ammonia and fatty acid in a batch process are allowed to react at about 200° C. under a pressure of 50 to 100 psig for about 10 to 12 hours. The rate of ammonia addition is adjusted so that a slight pressure is maintained in the reactor. Ammonia and water are continuously vented to facilitate completion of the reaction. Boric acid, aluminum oxide or titanium and zinc alkoxides are typical catalysts used in the reaction.

The alkyl mercaptans herein are generally produced by reacting hydrogen sulfide with olefins typically using a phosphite catalyst or an acidic catalyst in a free radical initiation reaction. Another method of producing alkyl mercaptans involves reacting hydrogen sulfide with an alcohol under acid catalyzed conditions, usually with conventional solid acidic catalysts.

The alkyl amines and alkyl mercaptans generally have from about 3 to about 30 carbon atoms, especially from about 4 to about 24 carbon atoms, preferably from about 4 to about 20 carbon atoms. The alkyl moiety of the amines and mercaptans typically are members selected from the group consisting of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, non-acosyl and triacontyl moieties and mixtures thereof.

The copolymers useful in the practice of this invention can be prepared in a conventional manner by bulk, solution or dispersant polymerization methods using known catalysts. Thus the copolymers utilized by this invention can be prepared from the corresponding monomers with a diluent such as water in a heterogeneous system, usually referred to as emulsion or suspension polymerization, or with a solvent such as toluene, xylene, benzene, ethylene dichloride, methyl isobutyl ketone, 4-methyl 2-pentanone or in a homogeneous system, normally referred to as solution polymerization. Solution polymerization for example in toluene, xylene, methyl isobutyl ketone, 4-methyl 2-pentanone or a solvent having similar chain transfer activity is the preferred method used in forming the copolymers disclosed herein, because this method and solvent produce preferred copolymers characterized by a molecular weight in the range of from about 5,000 to about 100,000. When the copolymer is dissolved in a solvent, the solvent normally will comprise from about 40 to about 90 weight percent based on the weight of the copolymer or individual monomers and amine or mercaptan compounds which combine to produce the copolymer.

Polymerization of the monomers used herein readily takes place under the influence or heat, light and/or catalysts. Suitable catalysts include free radical catalysts such as t-butyl perbenzoate, azo bis isobutyl nitrile and peroxide type free radical catalysts such as benzoyl peroxide, lauryl peroxide, or t-butylhydroperoxide. The preferred free radical catalysts are azo bis isobutyl nitrile and t-butyl-perbenzoate. The catalysts, when used, are employed in concentrations ranging from a few hundreds percent to two percent by weight of the monomers. The preferred concentration is from about 0.2 to about 1.0 percent by weight of the monomers.

Copolymerization of the monomers used herein takes place over a fairly broad temperature range depending upon the particular monomers and catalysts utilized in the reaction. For example, polymerization can take place at temperatures from about 70° C. to about 200° C. Thus, a preferred temperature range is from about 70° C. to 150° C. an especially preferred temperature range is from about 70° C. to about 130° C. The polymerization reaction is preferably carried out in an inert atmosphere, for example, nitrogen or argon to favor the formation of copolymers that have the desired molecular weights and high viscosities. The reactions are preferably conducted at ambient pressure, however, it is to be noted that higher pressures can be used for example, pressures of from about ambient pressure to about 25 psig can be employed in the reaction.

Preferably, the polymerization reaction is carried out to substantial completion so that the finished product is essentially comprised of the ratio of monomers introduced into the reaction vessel. Normally, a reaction time of from 1 to about 72 hours, preferably from 1 to about 50 hours, especially from 1 to about 10 hours, is sufficient to complete the polymerization process.

Specific examples of the copolymers which can be used according to the invention are the 0.01:0.01 to 1.0:1.0, especially the 0.01:0.01 to 0.8:0.8 molar ratio of (a) alpha olefin or alkyl vinyl ether and (b) maleic anhydride.

In a preferred mode, the (1) alpha olefin or alkyl vinyl ether and (2) unsaturated alpha, beta-dicarboxylic compound are reacted under the disclosed reaction conditions to form the copolymers herein. Then, the completed copolymers are contacted with an alkyl amine or alkyl mercaptan under reaction conditions to form the alkyl amine or alkyl mercaptan derivatives of the copolymers. The reaction conditions utilized for producing the copolymers herein are suitable for use in the alkyl amine and alkyl mercaptan reactions, except that the free radical polymerization catalyst is not used in the reaction. While it is not to be construed as being bound by theory, it is believed that the alkyl amine or alkyl mercaptan attached to the maleic anhydride moiety of the copolymer to form alkyl amine or alkyl mercaptan derivatives of the copolymer. Thus, the copolymer and alkyl amine or alkyl mercaptan are contacted at a temperature of from about 70° C. to about 200° C., preferably from about 70° C. to about 150° C. at a pressure of from about ambient pressure to about 25 psig, for about 1 to about 72 hours, especially from about 1 to about 50 hours.

Preferably, it is desirable to add an excess of alkyl amine or alkyl mercaptan to the reaction medium, so that all of the copolymer active sites undergo a reaction. Thus, the copolymer and alkyl amine or alkyl mercaptan are reacted at from about 0.01 to 0.01 to about 1.0 to 2.0 molar ratio, respectively. The alkyl amine or alkyl mercaptan derivatives of the copolymers herein have an average molecular weight of greater than about 1,000, especially a molecular weight range of from about 1,000 to about 100,000, especially from about 1,000 to about 70,000, preferably from about 5,000 to about 50,000.

The copolymers described herein can be incorporated in a wide variety of oil compositions, for example, crude oil, distillate fuel oils, mineral oils, and synthetic oils.

Crude oils, of course, are widely distributed around the world in the earth's crust as gases, liquids and solids. Crude oils are found as natural gas; a variety of liquids that are usually classified as normal or heavy crude oils, sweet or sour crude oils, and semisolid and solid substances, such as asphalt, tar, pitch, gilsonite and many similar substances. The crude oils suitable for use herein, however, are those liquid crude oils that can be produced through a well bore by current primary, secondary or tertiary (enhanced recovery) techniques.

The distillate fuel oils herein may be of virgin or cracked petroleum stock, or mixtures thereof, boiling in the range of about 300° F. (148.9° C.) to about 705° F. (398.9° C.) and preferably in the range of about 350° F. (176.7° C.) to about 650° F. (343.3° C.). The fuel oil may contain cracked components, such as for example, those derived from crude oils or cycle oil cuts boiling above gasoline, usually in the range of about 450° F. (232.2° C.) to about 750° F. (398.9° C.) and may be derived by catalytic or thermal cracking. Oils of high or low sulfur content such as diesel oils may be used.

Preferred distillate fuel oils which are improved in accordance with the invention have an initial boiling point within the range of about 350° F. (176.7° C.) to about 475° F. (246.1° C.) and an end boiling point in the range of about 500° F. (260° C.) to about 650° F. (343.3° C.), an API gravity of at least 30 and a flash point (P-M) not lower than about 110° F. (43.3° C.).

Suitable mineral oils include those oils that have been derived from paraffinic, napthenic or mixed base crude petroleum oils. These oils may have been subjected to solvent or sulfuric-acid treatment, aluminum chloride treatment, hydrogenation and or other refining treatments.

Synthetic oils as defined herein are those oils derived from a product of chemical synthesis or man made oils, as well as, shale oil, tar sand oil and oil derived from solid carbonaceous products, for example coal.

Shale oil consists of a marstone-type sedimentary inorganic material that contains complex organic polymers which are high molecular weight solids. Organic kerogen which is an integral component of shale oil, is a three dimensional polymer, is insoluble in conventional organic solvents and is associated with small amounts of a benzene-soluble material, e.g., bitumen.

The composition of shale oil depends on the shale from which it was obtained as well as the retorting method by which it was produced. Retorting or pyrolysis is the thermal decomposition of oil shale which yields liquid, gaseous and solid products. The amounts of oil, gas and coke which are ultimately formed, depend on the temperature-time history of the liberated oil and on the heating rate of the oil shale.

As compared with petroleum crude, shale oil contains large quantities of olefinic hydrocarbons which cause gumming and an increased hydrogen requirement for upgrading. High pour points are observed and small quantities of arsenic and iron are present. Generally, crude shale oil can be prerefined to produce a synthetic crude that is compatible with typical refineries and refinery processes.

Tar sands, also known as oil sands and bituminous sands, are sand deposits impregnated with dense, viscous petroleum. Tar sands are located throughout the world, often in the same geographical areas as conventional petroleum. The bitumen can be separated from tar sands by several different methods to produce a synthetic crude oil. For example, the hot-water separation process was an early method for recovering bitumen and for producing a synthetic crude oil. Other methods for producing a synthetic crude oil include in situ methods such as fire floods, steam drive and stimulation, and electric heating processes. More recent methods for producing synthetic crude oils from tar sands include mining the tar sands and direct coking, hot-water, cold-water and solvent processes.

Synthetic liquid fuel and oils derived from solid carbonaceous products are conveniently prepared by blending finely ground carbonaceous materials with a solvent to form a slurry. The slurry is then introduced into a reaction vessel containing a conventional hydrogenation catalyst and is reacted under normal hydrogenating pressures and temperatures. After hydrogenation, solids that are present can conveniently be removed from the product stream. The product is next stripped of solvent. The balance of the produce stream may be distilled to obtain products of various boiling range, for example, hydrocarbons boiling in the gasoline range and hydrocarbons boiling in the lubrication oil range. Some of the products are useful as fuels and oils, the remainder can be further treated by a conventional petroleum process including cracking, hydrocracking, and the like. Synthetic liquid fuel and oils produced from solid carbonaceous products such as coal are primarily aromatic and generally have a boiling range of about 300° F. (149° C.) to about 1400° F. (760° C.), a density of about 0.1 to about 1.1 and a carbon to hydrogen molecular ratio in the range of about 1.3:1 to about 0.66:1. A typical example is a solvent oil obtained from a subbituminous coal, such as Wyoming-Montana coal; comprising a middle oil having a boiling range of from about 375° F. (190.5° C.) to about 675° F. (375° C.).

The herein described copolymers can be incorporated in the oil composition in any convenient manner. Thus, the copolymers can be added directly to the oil by dissolving the desired copolymer in the oil composition at the desired level of concentration. Normally the copolymer is added to the oil at from about 0.01 to about 10 weight percent, preferably from about 0.1 to about 5 weight percent by weight of the oil composition. Alternatively, the copolymers herein may be blended with suitable solvents to form concentrates that can be readily dissolved in the appropriate oil composition at the desired concentration. If a concentrate is employed, it ordinarily will contain at least 10 to about 65 weight percent of the copolymer and preferably about 25 to about 65 weight percent of the copolymer. The solvent in such a concentrate normally is present in amounts of about 35 to about 75 percent by weight of the concentrate.

Solvents suitable for use in forming the concentrate herein include, petroleum based compounds, for example, naptha, kerosene, benzene, xylene, toluene, hexane, light mineral oil and mixtures thereof. The particular solvent selected should, of course, be selected so as not to adversely affect the other desired properties of the ultimate oil composition.

The following examples serve to demonstrate the best mode of how to practice the invention herein and should not be construed as a limitation thereof.

EXAMPLE I

An alkyl amine derivative of a copolymer of a mixture of $C_{24}$ to $C_{28}$ alpha olefins (sold commercially by Chevron Corporation, San Francisco, Ca.) and maleic anhydride was prepared by adding 50 grams (0.142 mole) of $C_{24}$ to $C_{28}$ alpha olefin and 0.3 ml (0.0079) of t-butyl perbenzoate to a 1-liter, 4-neck Pyrex glass resin kettle with detachable top and 2 screw caps (manufactured by ACE Glass Inc., Vineland, N.J.) equipped with a mechanical stirrer, a heating mantle containing a thermal couple (manufactured by the Thermal Electric Co., Saddle Brook, N.J.), a thermometer, a 250 ml addition funnel and a water cooled reflux condenser. The top of the addition funnel was equipped with a rubber septum and the top of the reflux condenser was equipped with a rubber stopper containing a clear plastic vacuum tube. The plastic tube from the rubber stopper connected to a firestone valve (manufactured by the Aldrich Co., Milwaukee, Wis.) containing a lead to vacuum and a lead to a gas source. Vacuum was supplied to the system by a Precision Vacuum Pump, Model Number DD195, manufactured by the GCA Corporation, Precision Scientific Group, Chicago, Ill. The system was vacuumed at 5 mm of Hg to remove air and flushed with nitrogen gas until the system equalized at atmospheric pressure in the resin kettle. Alternatively, a magnetic stirring bar, including apparatus can be used to replace the glass mechanical stirrer.

To the addition funnel was added 17.2 grams of maleic anhydride dissolved in 100 ml of toluene and 8 ml of methyl isobutyl ketone. The solution in the resin kettle was heated to 120° C.; the maleic anhydride solution in the addition funnel was slowly added over a period of 4 hours and the reaction mixture was heated for another 2 hours.

The copolymer thus produced, 30 grams (0.06 mole), was added to a 500 ml round-bottom, Pyrex-glass flask equipped with heating mantle, thermometer, water cooled condenser, Deanstark water trap and vacuum and nitrogen gas inlet at the top of the water cooled condenser.

Next, to the Pyrex flask was added 22 grams (0.081 mole) of $C_{18}$ amine and 100 ml of xylene. The reaction mixture was refluxed overnight (20 hours) under nitrogen atmosphere. The solvent was removed by evaporation and the reaction product formulated into a 10 weight percent toluene solution and tested for pour point activity.

EXAMPLE II

The procedure of Example I was followed to produce an octadecyl mercaptan derivative of a $C_{24}$ to $C_{28}$ olefin/maleic anhydride copolymer with the following exceptions:

to the Pyrex flask was added 15 grams (0.033 mole) of $C_{24}$ to $C_{28}$ olefin/maleic anhydride copolymer and 12 grams (0.041 mole) of octadecyl sulfide mixed with 100 ml of xylene. The reaction mixture was refluxed overnight (19 hours) under nitrogen atmosphere. Next, the solvent was stripped from the reaction product and the product was heated at 195° C. and 1 mm Hg for one hour. The reaction product (26 grams with a 96 percent yield) was added to toluene (10 weight percent solution) and tested for pour point activity.

EXAMPLE III

An octadecyl amine derivative of 1-octadecene/maleic anhydride copolymer was produced by adding 30 grams (0.085 mole) of 1-octadecene/maleic anhydride copolymer, purchased from the Polyscience Company, and 22 grams (0.081 mole) of octadecyl amine mixed with 100 ml of xylene to a 500 ml round-bottom, Pyrex-glass flask equipped with heating mantle, thermometer, water cooled condenser, Deanstark water trap and vacuum and nitrogen gas inlet at the top of the water cooled condenser. The reaction mixture was refluxed overnight (20 hours), and the water produced in the reaction discarded. The solvent was then stripped from the reaction product (62 grams) and a 10 weight percent in toluene solution was formulated.

EXAMPLE IV

An octadecyl amine derivative of octadecylvinyl ether/maleic anhydride polymer was produced in accordance with the procedure of Example III with the following exceptions:

To the Pyrex flask was added 30 grams (0.03 mole) of octadecylvinyl ether/maleic anhydride copolymer. The copolymer was purchased from the Aldrich Chemical Company, Milwaukee, Wis. which sells the copolymer commercially. Then, 12 grams (0.045 mole) of octadecylamine and 200 ml of xylene were added to the Pyrex flask. The reaction mixture was refluxed overnight (20 hours) under nitrogen atmosphere and the water which collected in the Deanstark trap was discarded. The solvent was stripped from the reaction product (20 grams with an 87 percent yield) and the reaction product was added to toluene (10 weight percent solution).

EXAMPLE V

An octadecyl mercaptan derivative of octadecylvinyl ether/maleic anhydride copolymer was produced using the procedure of Example IV with the following exceptions:

Octadecyl sulfide, 12 grams (0.041 mole), was substituted for the octadecyl amine. The reaction mixture was refluxed overnight (18 hours) under nitrogen atmosphere and the water collected in the Deanstark trap was discarded. The solvent was stripped from the reaction product (20 grams with an 83 percent yield) and the reaction product was formulated into a 10 weight percent solution in toluene.

EXAMPLES VI TO XI

The pour point enhancing properties of the polymers produced in Examples I through V were tested in accordance with the procedure set forth in ASTM-D97. The pour point properties of the polymers of Examples I through V were compared with Shellswim 5X ® and Shellswim 11T ®, two well known pour point depressants marketed commercially by the Shell Oil Company, Houston, Tex. All of the additives were added to the oil compositions at concentrations of 1,000 ppm active and 46.11° C. preheat. The results are tabulated in Table 1 below.

TABLE 1

| | | POUR POINT (°C.) | | | | | | | |
|---|---|---|---|---|---|---|---|---|---|
| Ex. | Crude Oils | Blank | Polymer Of Ex. I[1] | Polymer Of Ex. II[2] | Polymer Of Ex. III[3] | Polymer Of Ex. IV[4] | Polymer Of Ex. V[5] | Shellswim 5X[6] ® | Shellswim 11T[7] ® |
| VI | Kotter | 27 | 27 | — | — | 2 | 29 | 10 | 7 |
| VII | Delhi 87 | 24 | 18 | 21 | 16 | 16 | 13 | 21 | 21 |
| VIII | New Zealand | 32 | 10 | 27 | 2 | 21 | 29 | 21 | 21 |
| IX | Bombay | 29 | 7 | 27 | 32 | — | 35 | 10 | 13 |
| X | Salam | 21 | 16 | — | — | 2 | −29 | 16 | 10 |
| XI | Agiba | 18 | 2 | — | — | −7 | −12 | — | — |

[1] polymer of Ex. I - $C_{18}$ amine derivative of $C_{24}$–$C_{28}$ - olefin/maleic anhydride copolymer
[2] polymer of Ex. II - $C_{18}$ mercaptan derivative of $C_{24}$–$C_{28}$ - olefin/maleic anhydride copolymer
[3] polymer of Ex. III - $C_{18}$ amine derivative of $C_{18}$ - olefin/maleic anhydride copolymer
[4] polymer of Ex. IV - $C_{18}$ amine derivative of octadecyl ether/maleic anhydride copolymer
[5] polymer of Ex. V - $C_{18}$ mercaptan derivative of octadecyl ether/maleic anhydride copolymer
[6] Shellswim 5X ® - A $C_{18}$–$C_{22}$ alkylacrylate ester homopolymer, sold commercially by the Shell Oil Company, Houston, Texas
[7] Shellswim 11T ® - A $C_{18}$–$C_{22}$ alkylacrylate/4 vinyl pyridine copolymer sold commercially by the Shell Oil Company, Houston, Texas As can readily be determined from the above test results, the copolymers produced according to the procedure set forth herein gave superior or comparable pour point results when compared to commercial pour point additives for crude oils.

Obviously, many modifications and variations of the invention, as herein above set forth, can be made without departing from the spirit and scope thereof, and therefore only such limitations should be imposed as are indicated in the appended claims.

What is claimed is:

1. An oil composition which comprises a major amount of an oil selected from a crude oil or fuel oil and a minor amount of an alkyl amine or alkyl mercaptan derivative of an alpha olefin or alkyl vinyl ether and an unsaturated alpha, beta-dicarboxylic compound copolymer having pour point depressant properties said copolymer comprising the reaction product of (a) an alpha olefin having from about 2 to about 30 carbon atoms or mixtures of alpha olefins having from about 2 to about 30 carbon atoms or an alkyl vinyl ether or mixture of alkyl vinyl ethers having the formula:

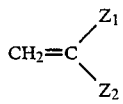

wherein $Z_1$ and $Z_2$ are the same or different, H, $R_1$ or $OR_1$ and $R_1$ is an alkyl group having 1 to 30 carbon atoms, (b) maleic anhydride; and (c) an alkyl sulfide having the formula:

wherein X is S and $R_2$ is an alkyl group having from about 3 to about 30 carbon atoms and y is either 1 or 2.

2. The oil composition of claim 1 wherein components (a), (b) and (c) are reacted in a molar ratio of from about 0.01:0.01:0.01 to about 1.0:1.0:2.0, said copolymer having a molecular weight of at least about 1,000.

3. The oil composition of claim 1 having a molecular weight of from about 1,000 to about 100,000.

4. The oil composition of claim 1 wherein $R_1$ of component (a) is alkyl having from about 4 to about 28 carbon atoms.

5. The oil composition of claim 1 wherein the alpha olefin of component (a) is a member selected from the group consisting of ethylene, propene, butene, pentene, hexene, heptene, octene, noneve, decene, undecene, dodecene, tridecene, tetradecene, pentadecene, hexadecene, heptacene, octadecene, nonodecene, eicosene, heneicosene, docosene, tricosene, tetracosene, pentacosene, hexacosene, heptacosene, octacosene, nonacosene and triacontene and mixtures thereof.

6. The oil composition of claim 1 wherein the alkyl vinyl ether of component (a) is a member selected from the group consisting of methyl vinyl ether, ethyl vinyl ether, propyl vinyl ether, butyl vinyl ether, pentyl vinyl ether, hexyl vinyl ether, heptyl vinyl ether, octyl vinyl ether, nonyl vinyl ether, decyl vinyl ether, undecyl vinyl ether, dodecyl vinyl ether, tridecyl vinyl ether, tetradecyl vinyl ether, pentadecyl vinyl ether, hexadecyl vinyl ether, heptadecyl vinyl ether, octadecyl vinyl ether, nonadecyl vinyl ether, eicosyl vinyl ether, heneicosyl vinyl ether, docosyl vinyl ether, tricosyl vinyl ether, tetracosyl vinyl ether, pentacosyl vinyl ether, hexacosyl vinyl ether, heptacosyl vinyl ether, octacosyl vinyl ether, nonacosyl vinyl ether and triacosyl vinyl ether and mixtures thereof.

7. The oil composition of claim 1 wherein the alkyl sulfide of component (c) is a member selected from the group consisting of propyl sulfide, butyl sulfide, pentyl sulfide, hexyl sulfide, heptyl sulfide, octyl sulfide, nonyl sulfide, decyl sulfide, undecyl sulfide, dodecyl sulfide, tridecyl sulfide, tetradecyl sulfide, pentadecyl sulfide, hexadecyl sulfide, heptadecyl sulfide, octadecyl sulfide, nonadecyl sulfide, eicosyl sulfide, heneicosyl sulfide, docosyl sulfide, tricosyl sulfide, tetracosyl sulfide, pentacosyl sulfide, hexacosyl sulfide, heptacosyl sulfide, octacosyl sulfide, nonacosyl sulfide and triacosyl sulfide and mixtures thereof.

8. The oil composition of claim 1 wherein the copolymer comprises from about 0.01 weight percent to about 10 weight percent of said oil composition.

9. The oil composition of claim 1 wherein the copolymer comprises from about 0.1 weight percent to about 5 weight percent of said oil composition.

10. An oil composition which comprises a major amount of an oil selected from a crude oil or fuel oil and a minor amount of a copolymer having pour point depressant properties which is obtained by free radical polymerization of a monomeric mixture comprising from about 0.01 to about 1.0 molar percent of (a) an alpha olefin or an alkyl vinyl ether having the formula:

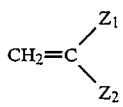

wherein $Z_1$ and $Z_2$ are the same or different, H, $R_1$ or $OR_1$ and $R_1$ is an alkyl group having 1 to about 30 carbon atoms, (b) from about 0.01 to about 1.0 molar percent of maleic anhydride to obtain a copolymer; and (c) by the reaction of from about 0.02 to about 2.0 molar percent of an alkyl sulfide with from about 0.01 to about 1.0 molar percent of the copolymer, said alkyl amine or alkyl sulfide having the formula:

wherein X is S and $R_2$ is an alkyl group having from about 3 to about 30 carbon atoms and y is either 1 or 2.

11. The oil composition of claim 10 wherein $R_1$ of component (a) is an alkyl group having from about 4 to about 28 carbon atoms.

12. The oil composition of claim 10 having a molecular weight of from about 1,000 to about 70,000.

13. The oil composition of claim 10 wherein the alpha olefin is a member selected from the group consisting of ethylene, propene, butene, pentene, hexene, heptene, octene, noneve, decene, undecene, dodecene, tridecene, tetradecene, pentadecene, hexadecene, heptacene, octadecene, nonodecene, eicosene, heneicosene, docosene, tricosene, tetracosene, pentacosene, hexacosene, heptacosene, octacosene, nonacosene and triacontene and mixtures thereof.

14. The oil composition of claim 10 wherein the alkyl vinyl ether component (a) is a member selected from the group consisting of methyl vinyl ether, ethyl vinyl ether, propyl vinyl ether, butyl vinyl ether, pentyl vinyl ether, hexyl vinyl ether, heptyl vinyl ether, octyl vinyl ether, nonyl vinyl ether, decyl vinyl ether, undecyl vinyl ether, dodecyl vinyl ether, tridecyl vinyl ether, tetradecyl vinyl ether, pentadecyl vinyl ether, hexadecyl vinyl ether, heptadecyl vinyl ether, octadecyl vinyl ether, nonadecyl vinyl ether, eicosyl vinyl ether, heneicosyl vinyl ether, docosyl vinyl ether, tricosyl vinyl ether, tetracosyl vinyl ether, pentacosyl vinyl ether, hexacosyl vinyl ether, heptacosyl vinyl ether, octacosyl vinyl ether, nonacosyl vinyl ether and triacosyl vinyl ether and mixtures thereof.

15. The oil composition of claim 10 wherein the alkyl sulfide of component (c) is a member selected from the group consisting of propyl sulfide, butyl sulfide, pentyl sulfide, hexyl sulfide, heptyl sulfide, octyl sulfide, nonyl sulfide, decyl sulfide, undecyl sulfide, dodecyl sulfide, tridecyl sulfide, tetradecyl sulfide, pentadecyl sulfide, hexadecyl sulfide, heptadecyl sulfide, octadecyl sulfide, nonadecyl sulfide, eicosyl sulfide, heneicosyl sulfide, docosyl sulfide, tricosyl sulfide, tetracosyl sulfide, pentacosyl sulfide, hexacosyl sulfide, heptacosyl sulfide, octacosyl sulfide, nonacosyl sulfide and triacosyl sulfide and mixtures thereof.

16. The oil composition of claim 10 wherein the copolymer comprises from about 0.01 weight percent to about 10 weight percent of said oil composition.

17. The oil composition of claim 10 wherein the copolymer comprises from about 0.1 weight percent to about 5 weight percent of said oil composition.

* * * * *